United States Patent [19]

Udagawa

[11] Patent Number: 5,092,613
[45] Date of Patent: Mar. 3, 1992

[54] STEEL LAMINATE GASKET

[75] Inventor: Tsunekazu Udagawa, Ichikawa, Japan

[73] Assignee: Ishikawa Gasket Co., Ltd., Tokyo, Japan

[21] Appl. No.: 625,672

[22] Filed: Dec. 13, 1990

[51] Int. Cl.⁵ .............................................. F16J 15/08
[52] U.S. Cl. ................................. 277/235 B; 277/236
[58] Field of Search ............... 277/235 B, 236, 232, 277/234

[56] References Cited

U.S. PATENT DOCUMENTS

| | | | |
|---|---|---|---|
| 4,739,999 | 4/1988 | Ishii et al. | 277/235 B |
| 4,750,749 | 6/1988 | Nicholson | 277/235 B |
| 4,759,585 | 7/1988 | Udagawa | 277/235 B |
| 4,861,046 | 8/1989 | Udagawa | 277/235 B |
| 4,867,462 | 9/1989 | Udagawa | 277/235 B |

FOREIGN PATENT DOCUMENTS 0285644 11/1989 Japan ........................ 277/235 B
2064677 6/1981 United Kingdom ......... 277/235 B Primary Examiner—William A. Cuchlinski, Jr.
Assistant Examiner—Daniel G. DePumpo
Attorney, Agent, or Firm—Kanesaka and Takeuchi

[57] ABSTRACT

A steel laminate gasket of the invention is designed to be installed in an internal combustion engine having at least one hole to be sealed. The gasket comprises first and third plates having beads around the hole, and a second plate situated between the first and third plates. The second plate does not extend adjacent to the hole. When the gasket is assembled, edge portions of the first and third plates directly face against each other, but the second plate terminates at a portion between or outside the beads. The gasket may provide moderate surface pressure at a portion slightly away from the hole to be sealed to prevent deformation of the engine parts. High surface pressure may be formed near the hole to be sealed.

10 Claims, 2 Drawing Sheets

STEEL LAMINATE GASKET

BACKGROUND OF THE INVENTION AND RELATED ART STATEMENT

The present invention relates to a steel laminate gasket for an internal combustion engine to provide desired surface pressure around a hole to be sealed.

An engine for an automobile has been developed to seek high power and light weight. In order to satisfy these demands for the engine, an engine is made of aluminum alloy, to which high temperature and high pressure are applied.

Since a steel laminate gasket is made of a plurality of steel plates, the steel laminate gasket is strong against high temperature and pressure. Therefore, the steel laminate gasket has been used widely for a recent engine to which high temperature and pressure are applied.

A cylinder head of a recent engine is generally made of aluminum alloy. In some cases, a cylinder block is also made of aluminum alloy. In case the cylinder head or cylinder block is made of aluminum alloy, a large amount of tightening pressure can not be applied to tighten the cylinder head and the cylinder block, because the cylinder head or cylinder block may deform by the tightening pressure.

Especially, when the gasket includes a wire ring around the cylinder hole, the cylinder head or cylinder block is liable to deform when tightened. Also, in case a large surface pressure is applied around a cylinder hole when the gasket is tightened, the cylinder head or cylinder block may deform around the cylinder hole.

As shown in FIGS. 1 and 2, a gasket 10 formed of an upper plate 11 with a bead 11a, a middle plate 12 and a lower plate 13 with a bead 13a is known. When the gasket 10 is tightened, the beads 11a, 13a deform to provide a strong surface pressure around a cylinder hole Hc. Therefore, unless the cylinder head and cylinder block are strong, the cylinder head and cylinder block may deform when tightened.

In U.S. Pat. No. 4,898,396, a gasket is formed of three plates, wherein upper and lower plates extend around a cylinder hole and have sealing mechanisms to seal therearound. In this patent, a surface pressure is formed adjacent to the cylinder hole.

Accordingly, one object of the present invention is to provide a steel laminate gasket, in which the cylinder head and cylinder block can be tightened at desired surface pressure when the gasket is tightened.

Another object of the invention is to provide a steel laminate gasket as stated above, which can provide moderate surface pressure at an area slightly away from the cylinder hole to prevent deformation of the cylinder hole.

A further object of the invention is to provide a steel laminate gasket as stated above, which can be easily and economically manufactured.

Further objects and advantages of the invention will be apparent from the following description of the invention.

SUMMARY OF THE INVENTION

In accordance with the present invention, the gasket is installed in an internal combustion engine having at least one hole to be sealed. Especially, the gasket is useful as a cylinder head gasket to seal around a cylinder hole.

The gasket comprises first, second and third plates laminated with each other. The first and third plates include first and third holes, and beads around the holes, respectively. The second plate is situated between the first and third plates and has a second hole larger than the first and third holes.

When the gasket is assembled, edge portions of the first and third plates adjacent the first and third holes directly face against each other, and an inner edge of the second plate is located between or outside of the beads of the first and third plates. Namely, the second plate does not extend adjacent to the cylinder hole.

Therefore, when the gasket is tightened, the beads of the first and third plates deform and form a plurality of corrugated beads to seal around the cylinder hole. Since the second plate does not overlap the edge portions of the first and third plates, surface pressure formed by the beads of the first and third plates is not so strong. Moderate surface pressure is obtained by the beads of the first and third plates. Especially, large surface pressure is formed at outside portions on the beads of the first and third plates, and moderate surface pressure is formed at inside portions on the beads.

Also, since the beads of the first and third plates are situated away from the cylinder hole, surface pressure formed by the beads and applied to an edge portion of the cylinder hole becomes weak. As a result, deformation of the cylinder head and cylinder block is substantially prevented.

A pressure forming member may be provided on at least one of the edge portions of the first and third plates to surround the cylinder hole. Surface pressure at the pressure forming member may be made higher or lower than the surface pressure at the beads as desired when the gasket is tightened. Also, surface pressure laterally outside the beads may be between the surface pressure at the beads and the surface pressure at the pressure forming member when the gasket is tightened.

The pressure forming member may be a flange integrally formed with the first or third plate. A part of the plate that the flange is formed may be turned or bent and situated over that plate to form the flange. Also, a part of the plate that the flange is formed may be bent to extend through a hole of the other plate that the flange is not formed, and turned to be situated over the edge portion of the other plate.

The pressure forming member may be a grommet installed inside the first and third holes, flanges of the grommet being placed outside the edge portions of the first and third plates.

DETAILED DESCRIPTION OF PREFERRED EMBODIMENTS

Figure 1:
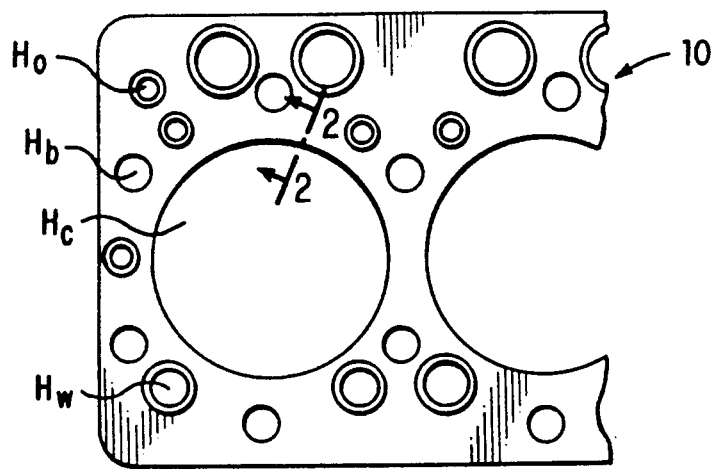
FIG. 1 is partial plan view of a conventional steel laminate gasket.
Figure 2:
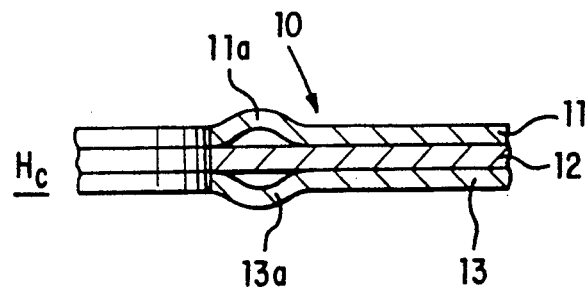
FIG. 2 is an enlarged section view taken along line 2—2 in FIG. 1.
Figure 3:
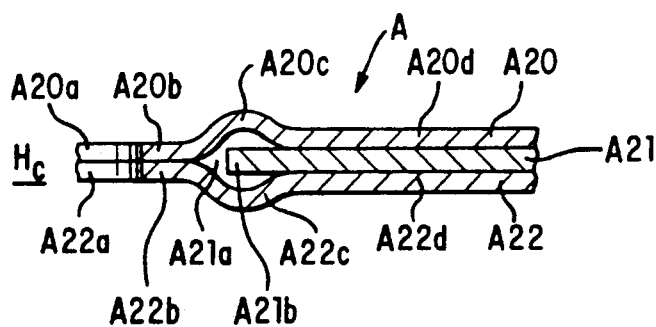
FIG. 3 is a section view, similar to FIG. 2, of a first embodiment of a steel laminate gasket of the invention.

Referring to FIG. 3, a first embodiment A of a steel laminate gasket of the present invention is shown. The gasket A includes cylinder holes Hc, water holes Hw, oil holes Ho and bolt holes Hb, as in the conventional gasket shown in FIG. 1.

In the gasket A, an area around the cylinder hole Hc is sealed in accordance with the present invention. Areas around the water holes Hw and oil holes Ho may be sealed in any sealing mechanisms. Therefore, sealing mechanisms around the water holes Hw and oil holes Ho are not explained in the present specification. The areas around the water holes Hw and oil holes Ho may be sealed in accordance with the present invention.

As shown in FIG. 3, the gasket A comprises an upper plate A20, a middle plate A21 and a lower plate A22. The upper and lower plates A20, A22 are symmetrically arranged relative to the middle plate A21.

The upper plate A20 is provided with a hole A20$a$ corresponding to a cylinder hole Hc, an edge portion A20$b$ located around the hole A20$a$, and a bead A20$c$ located around the edge portion A20$b$. A base portion A20$d$ extends substantially the entire area of the gasket A. A bottom surface at the edge portion A20$b$ is located slightly lower than a bottom surface at the base portion A20$d$.

A middle plate A21 is situated substantially under the base portion A20$d$ of the upper plate A20. The middle plate A21 includes a hole A21$a$ larger than the cylinder hole Hc.

The lower plate A22 is situated under the middle plate A21. The lower plate A22 is provided with a hole A22$a$ corresponding to the hole A20$a$, an edge portion A22$b$ located around the hole A22$a$, and a bead A22$c$ located around the edge portion A22$b$. A base portion A22$d$ extends substantially the entire area of the gasket A. An upper surface at the edge portion A22$b$ is located slightly higher than an upper surface at the base portion A22$d$.

When the gasket A is assembled, the edge portions A20$b$, A22$b$ abut against each other, and the middle plate A21 is substantially situated between the base portions A20$d$, A22$d$. An edge A21$b$ around the hole A21$a$ is situated between the beads A20$c$, A22$c$. The edge A21$b$ does not overlap the edge portions A20$b$, A22$b$ to thereby form a space, i.e. a part of the hole A21$a$, between the edge A21$b$ and the edge portions A20$b$, A22$b$.

When the gasket A thus assembled is tightened between a cylinder head and a cylinder block (both not shown), the beads A20$c$, A22$c$ are compressed and form a plurality of corrugated beads. The corrugated beads are partly located at the space or the hole A21$a$ between the edge A21$b$ and the edge portions A20$b$, A22$b$. Also, as the beads A20$c$, A22$c$ are compressed, the edge portions A20$b$, A22$b$ slightly move toward the cylinder hole Hc.

Therefore, when the gasket A is tightened, high surface pressure is formed on outside portions of the bead A20$c$, A22$c$, and low surface pressure is formed on inside portions of the beads A20$c$, A22$c$. Accordingly, moderate surface pressure is obtained when the gasket A is tightened.

In the gasket A, the thickness at the base portions A20$d$, A22$d$ with the middle plate A21 is thicker than the thickness at the edge portions A20$b$, A22$b$, and the beads A20$c$, A22$c$ are formed slightly away from the cylinder hole Hc. Therefore, when the gasket A is tightened, surface pressure is not directly applied just outside the cylinder hole Hc. Thus, deformation of the cylinder holes Hc is substantially prevented.

In FIG. 3, the gasket A is arranged such that the edge portions A20$b$, A22$b$ abut against each other when the gasket A is not tightened. However, the edge portions A20$b$, A22$b$ need not abut against each other when the gasket is assembled, i.e. a space may be formed between the edge portions A20$b$, A22$b$, so long as the edge portions A20$b$, A22$b$ abut against each other when the gasket A is tightened. Even if a space is formed between the edge portions, the gasket A operates as intended.

Figure 4:
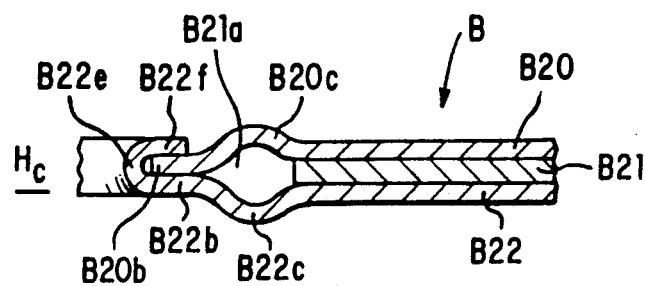
FIGS. 4 and 5 are section views, similar to FIG. 2, of second and third embodiments of the invention.

FIG. 4 shows a second embodiment B of the steel laminate gasket of the invention. The gasket B comprises an upper plate B20 with a bead B20$c$, a middle plate B21 and a lower plate B22 with a bead B22$c$, as in the gasket A. However, the lower plate B22 further includes a curved portion B22$e$ to define the cylinder hole Hc and a flange B22$f$ situated above the edge portion B20$b$. Further, a hole B21$a$ of the middle plate B21 is made larger than the hole A21$a$.

The thickness adjacent the cylinder hole Hc, i.e. total thickness of the flange B22$f$ and the edge portions B20$b$, B22$b$, is slightly thinner than the thickness outside the beads B20$c$, B22$c$, i.e. total thickness of the upper plate B20, middle plate B21 and lower plate B22.

Therefore, when the gasket B is tightened, corrugated beads are partly situated inside a hole B21$a$. Also as the beads B20$c$, B22$c$ are compressed, the edge portions B20$b$, B22$b$ with the flange B22$f$ slightly move toward the cylinder hole Hc. Therefore, the beads B20$c$, B22$c$ do not form high pressure. Namely, the inner portions of the beads B20$c$, B22$c$ form relatively low surface pressure, and the outside portions thereof form relatively strong surface pressure. In the gasket B, since the flange B22$f$ is formed around the cylinder hole Hc, an area around the cylinder hole Hc is properly sealed.

Figure 5:
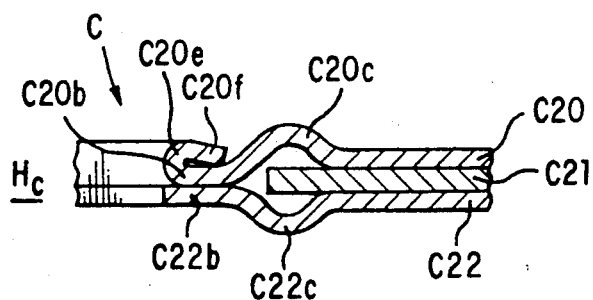
Figure 6:
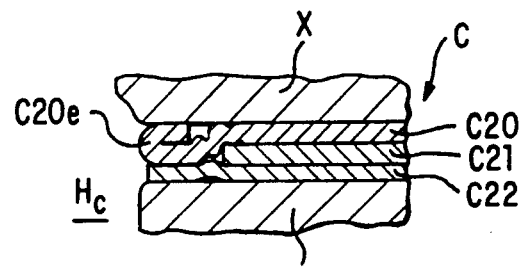
FIG. 6 is an explanatory section view for showing a compressed condition of the gasket as shown in FIG. 5.

FIGS. 5 and 6 show a third embodiment C of the steel laminate gasket of the invention. The gasket C comprises an upper plate C20 with a bead C20$c$, a middle plate C21, and a lower plate C22 with a bead C22$c$, as in the gasket A. However, in the gasket C, the upper plate C20 further includes a curved portion C20$e$ and a flange C20$f$ located above an edge portion C20$b$.

The total thickness adjacent the cylinder hole Hc, i.e. the thickness of the flange C20$f$, the edge portion C20$b$ and an edge portion C22$b$, is sightly thinner than the thickness outside the beads C20$c$, C22$c$, i.e. the thickness of the upper plate C20, the middle plate C21 and the lower plate C22.

As shown in FIG. 6, when the gasket C is compressed between a cylinder head X and a cylinder block Y, the beads C20$c$, C22$c$ form a plurality of corrugated beads to provide a moderate surface pressure, as in the gasket A. In the gasket C, when the gasket C is tightened, the curved portion C20$e$ is also firmly compressed. Since the curve portion C20$e$ has resiliency, the curved portion provides a surface pressure thereat. Therefore, the gasket C provides surface pressure adjacent the cylinder hole Hc, in addition to the feature as disclosed in the gasket A.

Figure 7:
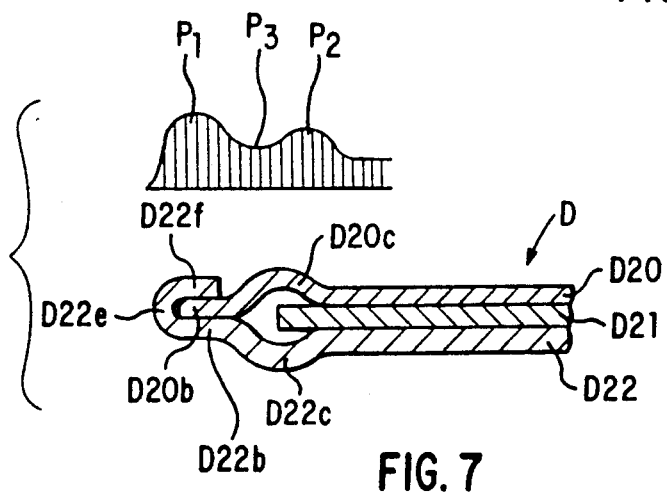
FIGS. 7 and 8 are section views, similar to FIG. 2, of fourth and fifth embodiments of the invention.

FIG. 7 shows a fourth embodiment D of a steel laminate gasket of the invention. The gasket D comprises an upper plate D20 with a bead D20$c$, a middle plate D21, and a lower plate D22 with a bead D22$c$, a curved portion D22e and a flange D22f, similar to the gasket B. In the gasket D, however, the thickness of the lower plate D22 is thicker than the other plates.

The total thickness adjacent the cylinder hole Hc, i.e. the thickness of the flange D22f, an edge portion D20b and an edge portion D22b, is slightly thicker than the thickness outside the beads D20c, D22c, i.e. the thickness of the upper plate D20, the middle plate D21 and the lower plate D22.

Therefore, when the gasket D is tightened, high surface pressure $P_1$ is formed near the cylinder hole Hc, i.e. at the flange D22f. The surface pressure $P_2$ formed at the outer halves of the beads D20c, D22c is weaker than the surface pressure $P_1$ but stronger than the surface pressure $P_3$ formed at the inner halves of the beads D20c, D22c. In the gasket D, high surface pressure is formed near the cylinder hole Hc.

As explained in the gasket D, when the thickness of the plates is changed, the portion where the surface pressure is applied as well as the strength of the surface pressure may be changed.

Figure 8:
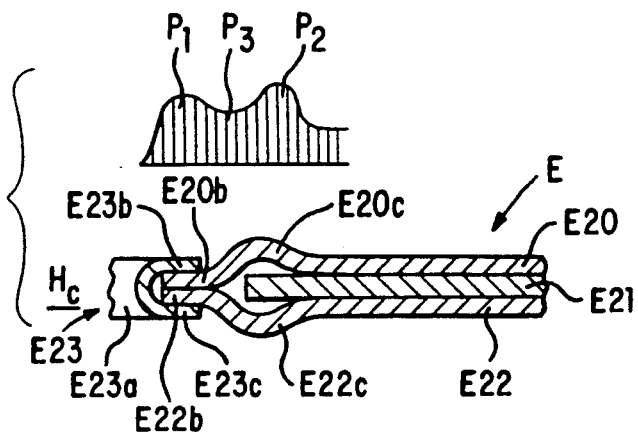

FIG. 8 shows a fifth embodiment E of the steel laminate gasket of the invention. The gasket E comprises an upper plate E20 with a bead E20c, a middle plate E21, and a lower plate E22 with a bead E22c, similar to the gasket A. The gasket E, however, further includes a grommet E23 with a curved portion E23a and flanges E23b, E23c. The flange E23b is located above an edge portion E20b, and the flange E23c is located under an edge portion E22b.

In the gasket E, the thickness near the cylinder hole Hc, i.e. the total thickness of the flanges E23b, E23c and the edge portions E20b, E22b, is thinner than the thickness outside the beads E20c, E22c, i.e. the total thickness of the plates E20, E21, E22.

Therefore, when the gasket E is tightened, surface pressure $P_1$ is formed near the cylinder hole Hc. The surface pressure $P_1$ is lower than surface pressure $P_2$ formed at outer halves of the beads E20c, E22c, but higher than surface pressure $P_3$ formed at inner halves of the beads E20c, E22c.

As explained in the gasket E, surface pressure near the cylinder hole may be changed by providing a grommet. Also, the amount of the surface pressure near the cylinder hole may be changed by changing the thickness of the grommet.

In the present invention, since the middle plate does not extend adjacent to the cylinder hole, seal coatings, which are not strong against high temperature, may be formed on the middle plate. As a result, it is possible to securely seal between plates adjacent a fluid hole, such as water and oil holes.

In accordance with the present invention, the beads are formed slightly away from the cylinder hole Hc, and are designed to provide a moderate surface pressure. In the gasket A, no surface pressure is formed adjacent to the cylinder hole Hc. In the gasket B, a small amount of surface pressure is formed adjacent to the cylinder hole, while the gasket C, a moderate amount of surface pressure is formed due to the curved portion near the cylinder hole. In the gasket D, a large amount of surface pressure may be formed near the cylinder hole. Also, surface pressure may be applied near the cylinder hole by a grommet, as shown in the gasket E.

While the invention has been explained with reference to the specific embodiments of the invention, the explanation is illustrative and the invention is limited only by the appended claims.

I claim:

1. A steel laminate gasket for an internal combustion engine having at least one hole to be sealed therein comprising, a first plate having at least one first hole therein corresponding to the hole of the engine, a first edge portion around the first hole and at least one first bead around the first edge portion to surround the same, a second plate situated under the first plate at a side where the first bead does not project, said second plate having at least one second hole larger than the first hole, and an inner edge around the second hole, and a third plate situated under the second plate and having at least one third hole substantially corresponding to the first hole, a second edge portion around the third hole and at least one second bead around the second edge portion to surround the second edge portion, said second bead projecting in a direction away from the second plate, said second edge portion directly facing the first edge portion and the inner edge of the second plate being located outside the first and second edge portions when the gasket is assembled so that when the gasket is tightened, the first and second edge portions directly abut and push against each other, inner portions of the first and second beads close to the hole of the engine provide moderate surface pressure and outer portions of the first and second beads away from the hole of the engine provide surface pressure higher than that formed at the inner portions.

2. A steel laminate gasket according to claim 1, further comprising a pressure forming member situated on at least one of the first and second edge portions to surround the hole of the engine to thereby provide a desired surface pressure at the pressure forming member when the gasket is tightened.

3. A steel laminate gasket according to claim 2, wherein surface pressure laterally outside the first and second beads relative to the hole of the engine when the gasket is tightened is between the surface pressure at the first and second beads and the surface pressure at the pressure forming member.

4. A steel laminate gasket according to claim 2, wherein said pressure forming member is a flange integrally formed with one of the first and third plates.

5. A steel laminate gasket according to claim 4, wherein said flange is integrally formed with the first plate, said flange being turned near the hole of the engine and situated above the first edge portion.

6. A steel laminate gasket according to claim 5, wherein a portion that the flange is turned has resiliency to provide surface pressure thereat when the gasket is tightened.

7. A steel laminate gasket according to claim 4, wherein said flange is integrally formed with the third plate, said flange being turned to extend inside the first hole and situated above the first edge portion of the first plate.

8. A steel laminate gasket according to claim 2, wherein the pressure forming member is a grommet having a curved portion situated inside the first and third holes, and flanges situated outside the first and second edge portions.

9. A steel laminate gasket according to claim 1, wherein said first plate further includes a first base portion located outside the first bead, and said third plate further includes a second base portion located outside the second bead, said second plate being installed between the first and second base portions.

10. A steel laminate gasket according to claim 1, wherein said inner edge of the second plate is located between the first and second beads without laminating the first and second edge portions.

* * * * *